United States Patent
Klinkner (10) Patent No.: US 6,836,832 B1
(45) Date of Patent: Dec. 28, 2004

(54) SYSTEM AND METHOD FOR PRE-SELECTING CANDIDATE DISKS BASED ON VALIDITY FOR VOLUME

(75) Inventor: Steven R. Klinkner, Fremont, CA (US)

(73) Assignee: Network Appliance, Inc., Sunnyvale, CA (US)

(*) Notice: Subject to any disclaimer, the term of this patent is extended or adjusted under 35 U.S.C. 154(b) by 301 days.

(21) Appl. No.: 10/027,909

(22) Filed: Dec. 21, 2001

(51) Int. Cl.⁷ .............................................. G06F 13/10
(52) U.S. Cl. ...................................................... 711/170
(58) Field of Search .............................. 711/114, 170, 711/171, 172; 714/7

(56) References Cited

U.S. PATENT DOCUMENTS

| | | |
|---|---|---|
| 5,163,131 A | 11/1992 | Row et al. |
| 5,355,453 A | 10/1994 | Row et al. |
| 5,485,579 A | 1/1996 | Hitz et al. |
| 5,802,366 A | 9/1998 | Row et al. |
| 5,819,292 A | 10/1998 | Hitz et al. |
| 5,897,661 A * | 4/1999 | Baranovsky et al. ........ 711/170 |
| 5,931,918 A | 8/1999 | Row et al. |
| 5,941,972 A | 8/1999 | Hoese et al. |
| 5,963,962 A | 10/1999 | Hitz et al. |
| 6,065,037 A | 5/2000 | Hitz et al. |
| 6,289,356 B1 | 9/2001 | Hitz et al. |
| 6,425,035 B2 | 7/2002 | Hoese et al. |

OTHER PUBLICATIONS

Gettys, J., et al., Request for Comments (RFC) 2616, HTTP/1.1, 1999.

* cited by examiner

*Primary Examiner*—Kevin L. Ellis
(74) *Attorney, Agent, or Firm*—Cesari and Mckenna, LLP; A. Sydney Johnston (57) ABSTRACT

A system and method for pre-selecting disks based on their characteristics for use with of a volume within a storage system such that only those disks that have suitable characteristics for the volume are selected. Characteristics of the volume and disks are obtained via a registry which accesses configuration data tables stored in the storage system. A program pre-selects those disks that qualify. The selected disks are then displayed to a user to enable the user to only have valid disks to choose from to perform, for example, a volume creation or volume expansion operation.

23 Claims, 11 Drawing Sheets

CREATE NEW VOLUME

ENTER VOLUME NAME  [________] —702

RAID GROUP SIZE  [________] —704

LANGUAGE  [POSIX ▼] —706

○ AUTOMATIC DISK SELECTION
708 ↗

NUMBER OF DISKS  [________] —712

DISK SIZE  [________ ▼] —714

○ MANUAL DISK SELECTION
710 ↗

```
3.4     (8GB)  ▲
3.5     (8GB)
3.6     (8GB)       —716
3.7     (8GB)  ▼
```

WILL THIS VOLUME BE MIRRORED?

○ YES

○ NO

718 —( BACK )     ( ADD )— 720

SYSTEM AND METHOD FOR PRE-SELECTING CANDIDATE DISKS BASED ON VALIDITY FOR VOLUME

RELATED APPLICATIONS

This application is related to the following United States Patent application: "SYSTEM AND METHOD FOR CONSOLIDATED REPORTING OF CHARACTERISTICS FOR A GROUP OF FILE SYSTEMS" by Brian M. Hackworth, filed on May 22, 2001, Ser. No. 09/862,949.

FIELD OF THE INVENTION

The present invention relates to storage systems and more particularly to systems and methods for pre-selecting disks based on the disks' validity with respect to volumes within a networked storage system environment.

BACKGROUND OF THE INVENTION

A file server is a type of storage system, that provides file service relating to the organization of information on storage devices, such as disks. The file server or filer implements a file system to logically organize the information as a hierarchical structure of directories and files on the disks. Each "on-disk" file may be implemented as a set of disk blocks configured to store information, such as text, whereas the directory may be implemented as a specially formatted file in which information about other files and directories are stored.

A storage system may be further configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link or a shared local area network (LAN) or wide area network (WAN). Each client may request the services of the filer by issuing file system protocol messages (in the form of packets) to the filer over the network.

A filer is organized so that it includes one or more storage "volumes" that comprise a cluster of physical storage disks, defining an overall logical arrangement of storage space. Currently available filer implementations can serve a large number of discrete volumes (for example 150, although this number is subject to increase). Each volume is generally associated with its own file system. The disks within a volume/file system are typically organized as one or more groups of Redundant Array of Independent (or Inexpensive) Disks (RAID). RAID implementations enhance the reliability and integrity of data storage through the redundant writing of data "stripes" across a given number of physical disks in the RAID group, and the appropriate caching of parity information with respect to the striped data. In the example of a WAFL-based file system, a RAID 4 implementation is advantageously employed. This implementation specifically entails the striping of data across a group of disks, and separate parity caching within a selected disk of the RAID group. Thus, in such a RAID 4 implementation, a volume includes at least two disks, namely, at least one data disk and one associated parity disk.

From time to time during operation, a storage system will need to create a new volume or extend an existing volume by adding disk drives as storage needs change. Moreover, one or more of the physical disk drives that comprise a volume may fail, in which case, the malfunctioning disk will need to be removed from the RAID group and/or volume and replaced with a working one. Many storage systems have a "pool" of spare disks that are attached to the system but have not been assigned to a file system or volume, and consequently are not actively storing data (i.e., such disks are not active disks). These spare disks can be utilized to form or extend volumes or replace a malfunctioning disk.

A spare disk that is to be used in creating a volume or to be added to an existing volume should have certain characteristics. These can include "disk characteristics" and "volume characteristics." An example of a disk characteristic is the size. For example, if a disk that is being replaced is 9 gigabytes (GB), the replacement disk should be at least 9 GB in size. An example of a volume characteristic is the style of checksum. Two common types of checksum are block and zoned. Block checksum sectors contain a 512-byte data segment and an eight-byte checksum for a total of 520 bytes per sector (BPS). Zoned checksum sectors contain a data segment and checksum, with a total of 512 BPS. A disk formatted with a 512 BPS configuration generally cannot be used in a block checksum volume; however, a disk formatted with a 520 BPS configuration can be used in either a block checksum volume or a zoned checksum volume. If a 520 BPS disk is used in a zoned checksum, the extra eight bytes are not used. For example, if a disk from the spare pool is to be added to a volume using blocked checksum, the spare disk must have 520 BPS. A spare disk having only 512 BPS could only be validly assigned to a volume using zoned checksum.

A user may interact with a filer to create a volume or to add a disk to an existing volume through the use of a command line interface (CLI) or a graphical user interface (GUI). The CLI enables the user to type in commands for the filer to execute. The GUI is typically accessed via a web browser running on the user's computer and connected to the filer via a hypertext transfer protocol (HTTP) connection. The GUI presents a menu of options that is selected by the user via a mouse or other pointing device and generates commands for the filer to execute.

In a known system employing a manual approach to disk selection, a GUI option, screen is used to display user-selectable operations, for example the option to create a volume or to add a disk to a volume. The option screen may also show, a list of identifiers (Ids) of available disks in the spare pool and their size. The user can select one or more disks from the screen (e.g., by highlighting the selected disks in the list) in accordance with the requested "create" or "add" operation. The user makes the selection in this known system based on what the user knew of any required disk and volume characteristics since no such information is normally displayed on screen. Since the list of spares includes all disks (even those not "valid" for the requested operation, e.g., due to their size or checksum), the user might select an invalid disk. If the user selects a disk that is not valid and then attempts to initiate the resulting command, (by submitting the page to the filer via HTTP for processing by the storage operating system), an error message is generated and the command is not executed. Thus, the administrator or user must go through a trial and error process to be able to successfully add a disk to a volume. While suitable for the more sophisticated users, this manual approach manifests distinct disadvantages in ease of operation.

The known system provides an alternative to the manual disk selection technique just described. In this alternative, the system responds to a user-indicated "add" or "create" operation by selecting suitable disks automatically.

Accordingly, it is an object of the present invention to provide a system and method for selecting disks for creation or expansion of a volume that provides ease of use and faster administration, while giving the user a high degree of control in the disk selection process.

SUMMARY OF THE INVENTION

This invention overcomes the disadvantages of the prior art by providing a system and method for pre-selecting candidate disks that can be validly used with a volume of a storage system. Pre-selection can be made based on many characteristics including characteristics associated with the volume and/or the disk. The storage system creates and maintains a set of data structures or tables, including a disk table and a volume table. The disk table contains characteristics of all disks affiliated with the storage system whereas the volume table contains the characteristics of all volumes served by the storage system.

The preselected disks can be presented to a user as pre-qualified candidates, from which the user can select the disks to be used in a new volume or added to an existing volume. For example, the storage system can display a graphical user interface (GUI) including an interactive screen view for volume creation and expansion, or separate screen views for the two operations. By means of the GUI, the user can be presented with a list of disks that are preselected as suitable for use with a volume. Then, the user can interactively designate (e.g., by highlighting) one or more of the disks identified in the list to be used with the volume. In alternative implementation, the user may be presented with one or more alternative mechanisms for disk designation: an automatic designation mechanism in which the system permits the user only to select the number of disks and their sizes, and a manual designation mechanism in which the system preselects the disks and permits the user to designate disks from the preselected list according to the user's own criteria. The latter manual designation will appeal to sophisticated users who wish to custom configure the disk subsystem for performance or other reasons.

In a specific implementation, a registry is provided that interfaces with the file system and a Java virtual machine (JVM). The registry provides hooks into the volume and disk tables that are then accessible via an application program interface (API) to the JVM. A Java program, such as a servlet, can access the data stored in the tables via calls to the API. According to this implementation when a graphical user interface presents a list of disks to be selected for an "add" or "create" operation, only those disks that are valid for the operation are displayed. A process (e.g. a Java servlet) obtains information on the spare disks and the volume via a call to the API associated with the registry and the process selects those disks that match the characteristics required. The graphical user interface only displays valid disks for the volume involved. This pre-selection reduces operator time and errors.

BRIEF DESCRIPTION OF THE DRAWINGS

The above, and further advantages of this invention may be better understood by referring to the following description in conjunction with the accompanying drawings in which like reference numerals indicate identical or functionally similar elements.

DETAILED DESCRIPTION OF THE ILLUSTRATIVE EMBODIMENTS

Figure 1:
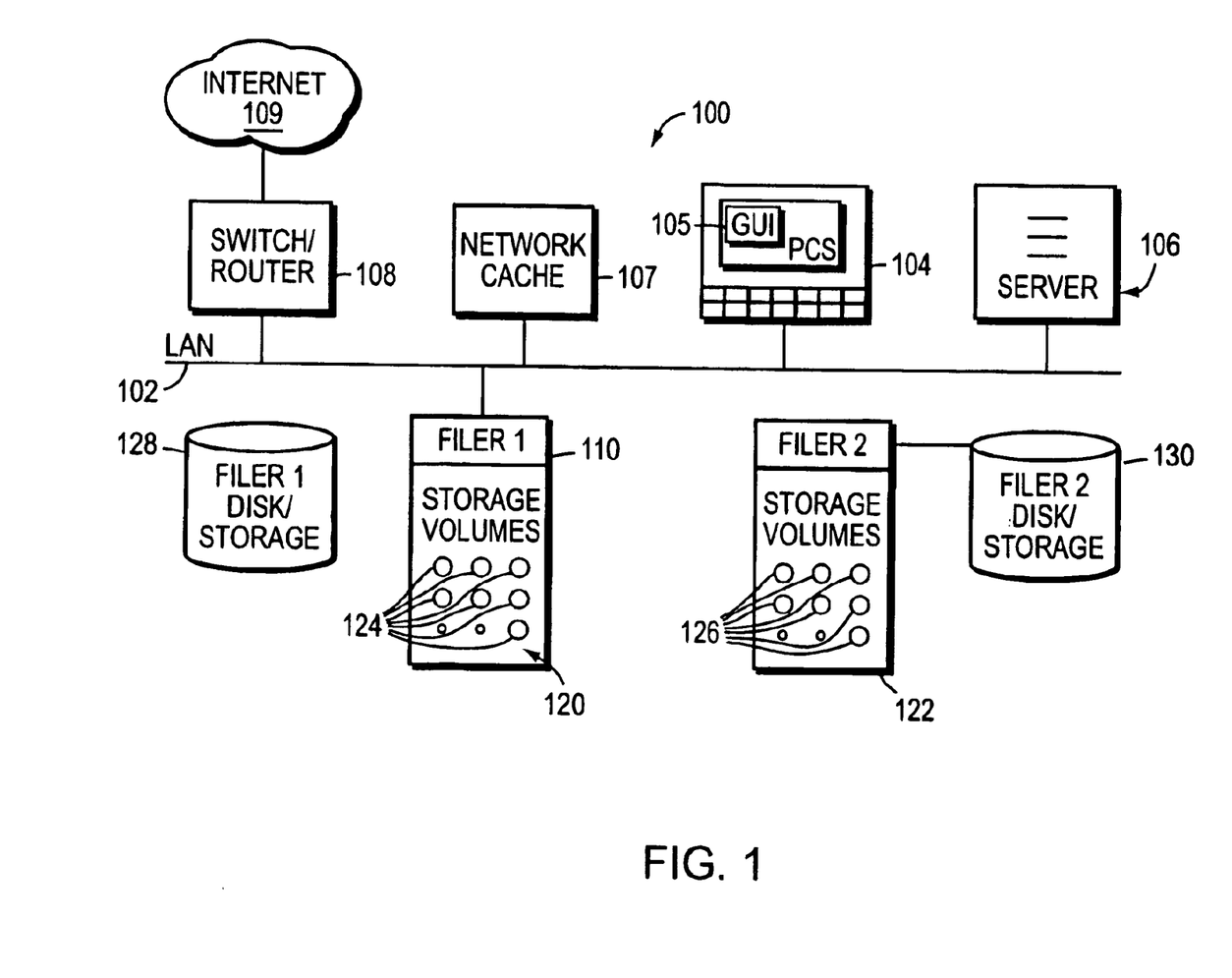
FIG. 1 is a schematic block diagram of a network environment including various networked devices including exemplary filers and associated volumes and disks.

FIG. 1 is a schematic block diagram of an exemplary network environment 100 in which the principles of the present invention are implemented. The network 100 is based around a local area network (LAN) interconnection 102. However, a wide area network (WAN), virtual private network (VPN) implementation (utilizing communication links over the Internet, for example), or a combination of LAN, WAN and VPN implementations can be established. For the purposes of this description, the term "LAN" should be taken broadly to include any acceptable networking architecture. The LAN 102 interconnects various clients based upon personal computers (PCs) 104, servers 106 and a network cache 107. Also interconnected to the LAN may be a switch/router 108 that provides a gateway to the well-known Internet 109, thereby enabling various networked devices to transmit and receive internet based information, including e-mail, web content, and the like.

It will be understood by those skilled in the art that the inventive technique described herein may apply to any type of special-purpose (e.g. server) or general-purpose computer, including a standalone computer, embodied as a storage system. To that end, filer 110 will hereinafter be referred to as storage system 110. Moreover, the teachings of this invention can be adapted to a variety of storage system architectures including, but not limited to, a network-attached storage environment, a storage area network and disk assembly directly-attached to a client/host computer. The term "storage system" should therefore be taken broadly to include such arrangements.

In addition, exemplary storage systems 110 and 112 (Filer1 and Filer2, respectively) are connected to the LAN. These storage systems, (described further below) are configured to control storage of, and access to, data in a set of interconnected storage volumes 120 and 122, respectively. The volumes 124, 126, respectively, are numbered 0–N. As described further below, each volume is typically organized to include one or more RAID groups of physical storage disks for increased data storage integrity and reliability.

Each storage system 110, 112 can also include a dedicated storage cache/disk 128, 130, respectively for storage system applications and data handling functions. Each of the devices attached to LAN include an appropriate, conventional network interface arrangement (not shown) for communicating over the LAN using desired communication protocols, such as the well-known Transport Control Protocol/Internet Protocol (TCP/IP), User Datagram Protocol (UDP), Hypertext Transfer Protocol (HTTP) or Simple Network Management Protocol (SNMP).

Figure 2:
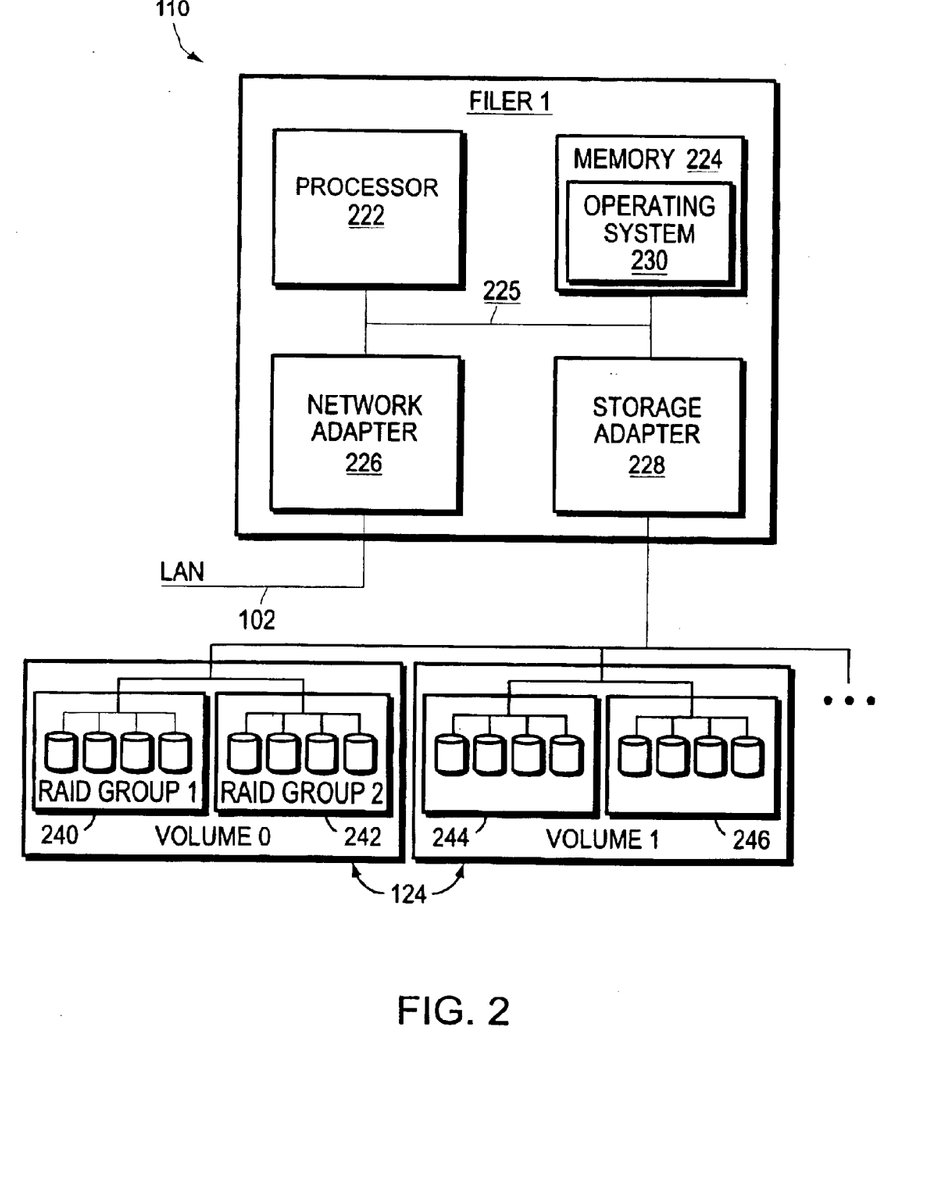
FIG. 2 is a more-detailed schematic block diagram of an exemplary filer appliance in accordance with FIG. 1.

FIG. 2 is a more-detailed schematic block diagram of the exemplary storage system 110 (Filer 1) that is advantageously used with the present invention. Other storage systems can have similar construction (including exemplary Filer2 112). The storage system can be implemented as a network storage appliance, which system is a special-purpose computer that provides file service relating to the organization of information on storage devices, such as disks. However, it will be understood to those skilled in the art that the inventive concepts described herein may apply to any type storage system, whether implemented as a special-purpose or general-purpose computer, including a standalone computer. The storage system 110 comprises a processor 222, a memory 224, a network adapter 226 and a storage adapter 228 interconnected by a system bus 225. The storage system 10 also includes an operating system 230 that implements a file system to logically organize the information as a hierarchical structure of directories and files on the disks.

In the illustrative embodiment, the memory 224 may have storage locations that are addressable by the processor and adapters for storing software program code and data structures associated with the present invention. The processor and adapters may, in turn, comprise processing elements and/or logic circuitry configured to execute the software code and manipulate the data structures. The operating system 230, portions of which are typically resident in memory and executed by the processing elements, functionally organizes the storage system 110 by, inter alia, invoking storage operations in support of a file service implemented by the storage system. It will be apparent to those skilled in the art that other processing and memory means, including various computer readable media, may be used for storing and executing program instructions pertaining to the inventive technique described herein.

The network adapter 226 comprises the mechanical, electrical and signaling circuitry needed to connect the storage system 10 to a client 104 (see FIG. 1) over the computer network (LAN 102), which, as described generally above, can comprise a point-to-point connection or a shared medium. A client 104 can be a general-purpose computer configured to execute applications including application block protocols, such as the Hypertext Transfer Protocol (HTTP). Moreover, the client can interact with the storage system 10 in accordance with a client/server model of information delivery. That is, the client may request the services of the storage system, and the storage system may return the results of the services requested by the client, by exchanging messages that encapsulate, e.g., the HTTP protocol format over the network 102. The format of the HTTP message is well-known and described in *"Request for Comments (RFC) 2616, HTTP/1.1"* by J. Gettys et al (1999) which is hereby incorporated by reference.

The storage adapter 228 cooperates with the operating system 230 executing on the storage system to access information requested by the client, which information may be stored on a number of storage volumes 124 each constructed from an array of physical disks that are organized as, e.g. RAD groups 240, 242, 244 and 246. The RAID groups include independent physical disks including those storing striped data (D) and those storing separate parity (P) for the data, in accordance with a preferred RAID 4 configuration. However, other configurations (e.g. RAID 5) are also contemplated.

The storage adapter 228 includes input/output (I/O) interface circuitry that couples to the disks over an I/O interconnect arrangement, such as a conventional high-performance, Fibre Channel serial link topology. The information is retrieved by the storage adapter 228 and, if necessary, processed by the processor 222 (or the adapter 228 itself prior to being forwarded over the system bus 225 to the network adapter 226, where the information is formatted into a packet and returned to the client 104.

To facilitate access to the disks 130, the operating system 230 implements a file system that logically organizes the information as a hierarchical structure of directories and files on the disks. Each "on-disk" file may be implemented as set of disk blocks configured to store information, such as text, whereas the directory may be implemented as a is specially formatted file in which other files and directories are stored. In the illustrative embodiment described herein, the operating system 230 associated with each volume is preferably the NetApp® Data ONTAP™ operating system available from Network Appliance, Inc. of Sunnyvale, Calif. that implements a Write Anywhere File Layout (WAFL) file system. The preferred operating system for the exemplary storage system is now described briefly. However, it is expressly contemplated that the principles of this invention can be implemented using a variety of alternate operating system architectures.

Figure 3:
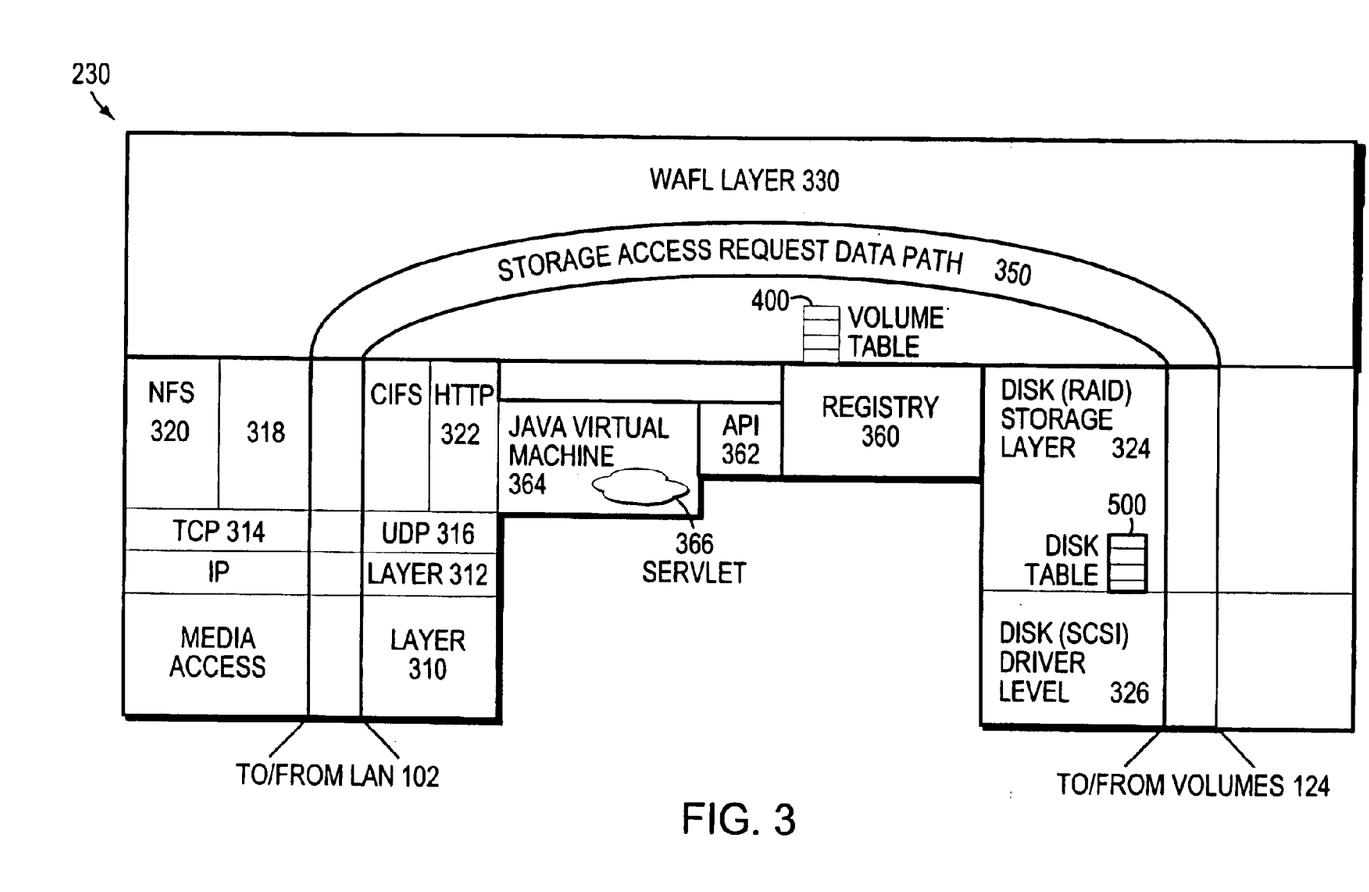
FIG. 3 is a schematic block diagram of an operating system for use with the exemplary filer of FIG. 2 according to an embodiment of this invention.

FIG. 3 is a schematic diagram of the operating system 230 comprising a series of software layers, including a media access layer 310 of network drivers (e.g., an Ethernet driver). The operating system 230 further includes network protocol layers, such as the IP layer 312 and its TCP layer 314, and UDP layer 316. A file system protocol layer 318 provides multi-protocol data access and, to that end, includes support for the Common Internet Files System (CIFS) protocol, the Network File System (NFS) protocol 320 and the HTTP protocol 322. In addition, the operating system 230 includes a disk storage layer 324 that implements a disk storage protocol, such as a RAID protocol, and a disk driver layer 326 that implements a disk access protocol such as, e.g., a Small Computer Systems Interface (SCSI) protocol. Bridging the disk software layers with the network and file system protocol layers is a WAFL file system layer 330 of the operating system.

Generally, the WAFL layer implements the WAFL file system having an on-disk format representation that is block-based using, e.g., 4-kilobyte (KB) data blocks and using inodes to describe the files. The WAFL file system generates operations to load (retrieve) the requested data from volumes 124 if it is not resident "in-core", i.e., in the storage system's memory 224. Upon completion of the request, the storage system (and operating system) returns a reply, e.g., a conventional acknowledgement packet defined by the CIFS specification, to the client 104 over the network 102.

Figure 4:
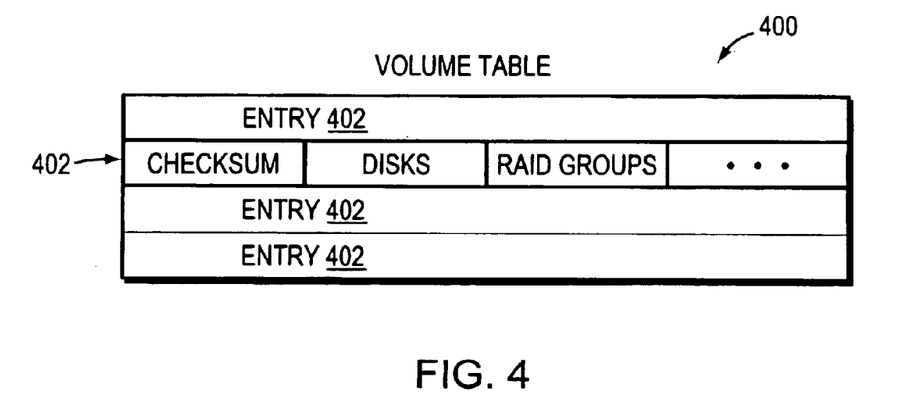
FIG. 4 is a diagram of a volume table associated with the file storage layer of FIG. 3.

The WAFL system layer 330 also creates and maintains a volume table 400 in e.g. memory 224. FIG. 4 shows a diagram of an illustrative volume table 400. The volume table 400 comprises a series of entries 402; wherein each entry 402 contains a set of data about the characteristics of the volume. Illustrative data identifies the type of checksum used, the disks that are affiliated with the volume, and the RAID group structure affiliated with the volume, and whether the volume is mirrored or not. It is expressly contemplated that additional or other data may be stored in the volume table.

Figure 5:
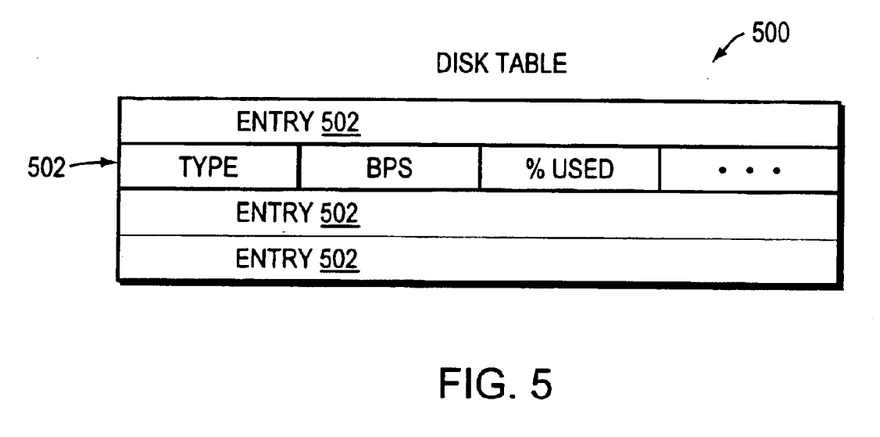
FIG. 5 is a diagram of a disk table created and maintained by the RAID layer of FIG. 3.

Similarly, the disk storage layer 324 creates and maintains a disk table 500. FIG. 5 is a diagram of an illustrative disk table 500 that is created and maintained by the disk storage level in memory 224. The disk table 500 contains an entry 502 for each disk attached to the storage system. Each entry 502 contains data about the associated disk, for example, identifying the type of disk, the BPS, the percentage used, the storage capacity of the disk (i.e. size) and the adapter card to which the disk is attached. In certain implementations in which the spare pool is partitioned into sub-pools, each with spare disks to be connected only to a particular adapter, the adapter card ID identifies a corresponding sub-pool. A common naming convention for a disk attached to a storage system is X.Y, where both X and Y are integer values. The X value represents the adapter to which the disk is physically and electrically connected, while the Y value represents the actual location of the disk within a storage shelf. It is expressly contemplated that additional or other data may be stored in the disk table.

The WAFL layer 330 or disk storage level 324 dynamically create and update these tables during the course of operation.

Additionally, the operating system 230 comprises a registry 360 having interfaces to both the disk storage layer 324 and the WAFL system layer 330. The registry 360 is a naming mechanism used in accessing configuration data regarding volume and disk characteristics. The registry names are used as indexes into the disk table 400 and volume table 500. In the illustrative embodiment, a registry lookup operation maps to code within the storage operating system that accesses appropriate table structures maintained by the disk storage WAFL layer to retrieve the configuration data. More specifically, the registry 360 has an application program interface (API) 362 that permits a Java Virtual Machine 364 access to data stored in tables 400 and 500. A Java servlet 366 can thus access the API 362, which interfaces with the registry 360. For example, in response to a data request received by the servlet, the registry 360 accesses the appropriate tables 400, 500 within the WAFL or disk storage layers, retrieves the requested data, and returns the data via the API 362 to the servlet 366. The servlet 366 can then perform a novel preselection process to determine which disks are valid for a specific volume or operation. It should be noted that it is expressly contemplated that other forms of programs can be used in accordance with this invention, including as examples, applets, programs, processes, and threads. Additionally, it should be further noted that the API can also interface with other levels of the operating system and other programming languages, e.g. C, or C++. Additionally, the registry 360 can be exposed via the CLI to enable access to the configuration data by user.

An illustrative example of a call to the registry API in Java is:

String bps=Registry.get("status.disks.3.1.bytes_per_sector");

This function call stores the BPS of Disk3.1 in the string variable bps.

The storage operating system 230 further supports a graphical user interface (GUI) 105, which can be used to issue commands and perform maintenance and administrative functions to the storage system. The GUI 105 is displayed to a web browser connected to the storage system via a HTTP connection. Thus, in accordance with an embodiment of the present invention, it is possible to obtain information related to disks and volumes via the registry 360 and then only display those disks that are valid for the volume involved. This pre-selection is done when the user is presented with a list of disks to choose from.

The following is a generalized pseudo-code description of the pre-selection process that a program performs when pre-selecting disks to add a disk according to an embodiment of the invention:

```
set DiskToBeAdded.Characteristics = get(data.<disktobeadded>.characteristics);(1)
set Volume.Characteristics. = get(data.volume.characteristics);(2)
set disks[ ] = get(data.SpareDisks[ ]);
for (n = 1 to sizeof(disks[ ]))
{
if DiskToBeAdded.Characteristics. = disks[n].DiskCharacteristics
AND
Volume.Characteristics. = disks[n].VolumeCharacteristics
then set disks[n].display = TRUE;(3)
else set disks[n].display = FALSE;
}
for (x = 1 to sizeof(disks[ ]))
{
if disks[x].display = TRUE then DisplayInMenu(disk(x));(4)
}
```

With reference to the above pseudo code listing the following comments apply to the steps numbered in parenthesis:

1. The get( ) function is a call to the API of the registry. The registry then accesses the appropriate disk table, retrieves the desired information, and returns the data via the API.
2. The get( ) function call to the API will result in the registry retrieving the characteristics of the selected volume from the appropriate volume table in the file system layer.
3. The "if/then/else" statement noted above can be readily modified by one of skill in the art depending on whether a spare disk is being pre-selected to be used in the creation of a volume or if a spare disk is simply going to be added to the volume.
4. The DisplayInMenu( ) function call can either actually display the disk in a menu on the GUI or simply add the disk that has been pre-selected into a list of disks to be displayed.

Illustrative volume characteristics that can be used in pre-selecting candidate disks include the type of checksum, the RAID group structure and the mirroring status. In a preferred embodiment, the volume can have either zoned or block checksum. Moreover, a volume can be mirrored or not. The RAID group structure details how many disks there are per RAID group affiliated with the volume. For example, if RAID 4 is utilized, there must be at least 2 disks per RAID group, but in some implementations, as many as a maximum of 28 disks can be utilized.

If a volume is mirrored, disks must be added to both the primary volume and each mirror. According to a preferred embodiment of mirroring, disks should have an exact match between the source volume and the mirror volume as to disk size and bytes per sector, but the data disks and mirror disks should be connected to different adapters (i.e., have different Adapter Ids).

Illustrative disk characteristics that can be used in pre-selecting candidate disks include the size, the BPS and the adapter card. Illustrative BPS include 520 BPS and 512 BPS. A spare disk having 512 BPS can only be used in a volume utilizing disks having 512 BPS. Additionally, if a volume utilizes 512 BPS disks (i.e. the volume uses zoned checksum), disks having 520 BPS can be added to the volume.

In a preferred embodiment, spare disks are organized in pools or sub-pools according to the adapter card to which they are attached. If a volume is mirrored, the disks for each mirror should come from separate, distinct sub-pools for each mirror to improve reliability in the event that an adapter fails. Thus, if a volume is mirrored, the adapter ID corresponding to the adapter card to which a disk is attached can be utilized as a characteristic to be matched.

Figure 6:
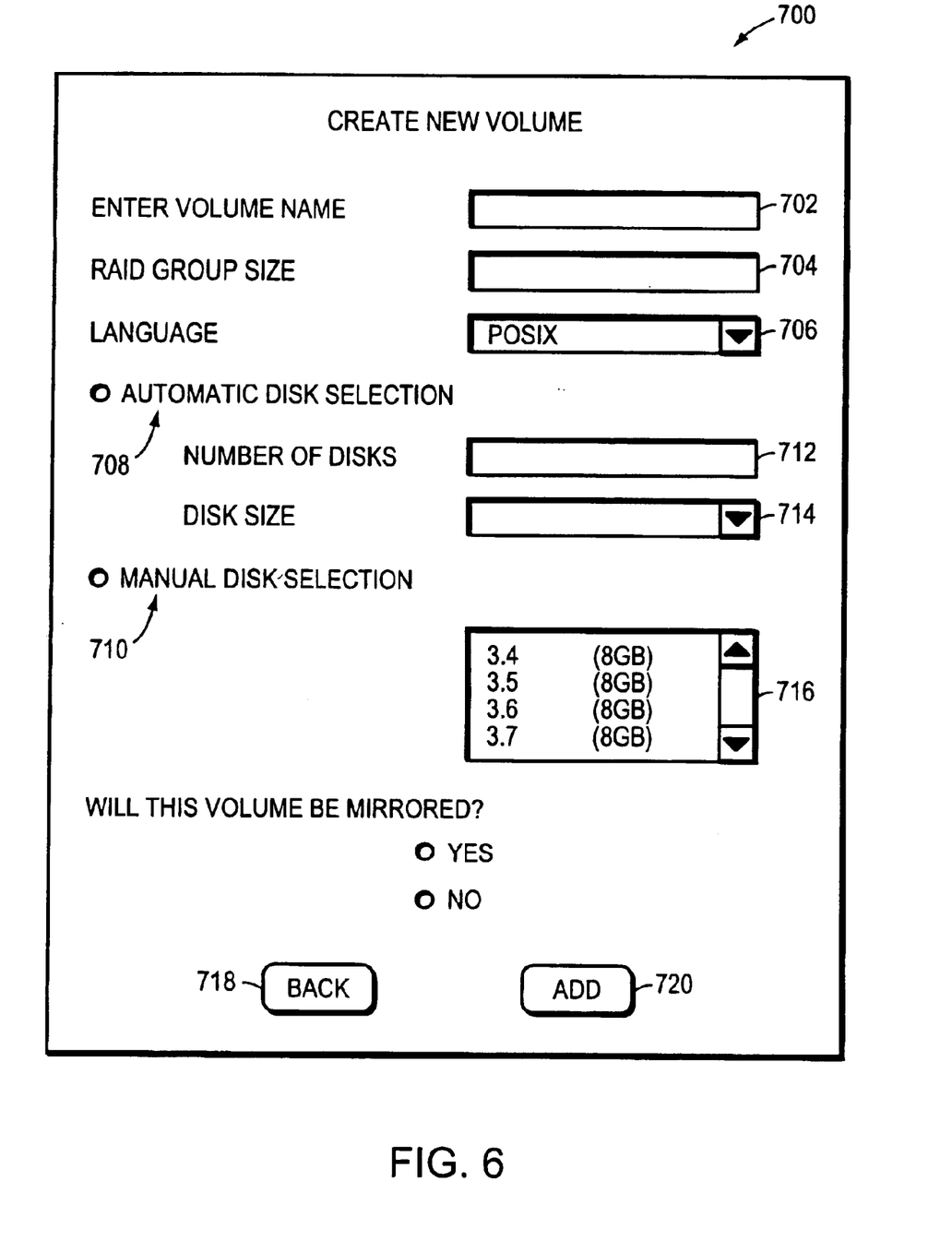
FIG. 6 is an exemplary screenshot of a GUI for Volume Creation operation, showing a Manual Disk Selection option with a candidate disk selector menu in accordance with this invention.

FIG. 6 shows an illustrative embodiment of one of the screens of the GUI displayed to a user for a "new volume creation" operation. It is expressly contemplated that a variety of formats and organizational schemes for displaying and manipulating data can be employed. The version described herein is only one possible arrangement. FIG. 6 shows an illustrative GUI window 700 for creating a volume that has a volume name entry field 702, a RAID group size field 704, a language menu 706 and buttons for Back 718 and Add 720. During operation, a user enters a volume name unique within the storage system in the volume name entry field 702. A user also enters the maximum size of the RAID group in terms of number of disks, and the language to be used on the new volume. In this illustrative screenshot, the Automatic Disk Selection option 708 has been selected by a user, e.g. using a "point and click" tool (not shown) such as a mouse. With the Automatic Disk Selection, there is a field for user entry of the number of disks 712, and a field for the size of these disks 714, typically expressed today in GigaBytes (GB). For example, the disk size field 714 can present the disk sizes as a drop down menu of available sizes. If the user is willing to add any disk sizes available, an "any size disk" entry is indicated in the menu. After the user enters the foregoing information in fields 702–714, and points and clicks on the "Add" button, the storage system responsively forms a new volume having the designated name, volume characteristics, and disk characteristics, while automatically selecting the disks constituting the volume from the disk pool with no further user involvement.

Alternatively, the Manual Disk Selection option 710 can be selected. In response, the storage system presents the user a disk selector menu 716 that displays disks that have been pre-selected/pre-qualified, based on the disks' validity for the new volume. In accordance with the present invention, the disk selector menu 716 only displays those disks that are valid for the new volume. Notably, the disks that are valid for the "volume creation" operation are pre-selected before being displayed to the user: Then, responsive to the display, a user can select those disks to constitute the volume, e.g. by highlighting the menu entries using a point and click device. As illustrated, the menu can present the user with relevant information regarding the disks, such as disks size, checksum type, adapter ID. etc. to assist the user in making informed choices. After a user selects the disks, the user simply points and clicks on the "add" button 720 to enter his or her selections. The storage system responsively forms a new volume from the selected disks with no further user involvement.

Figure 7:
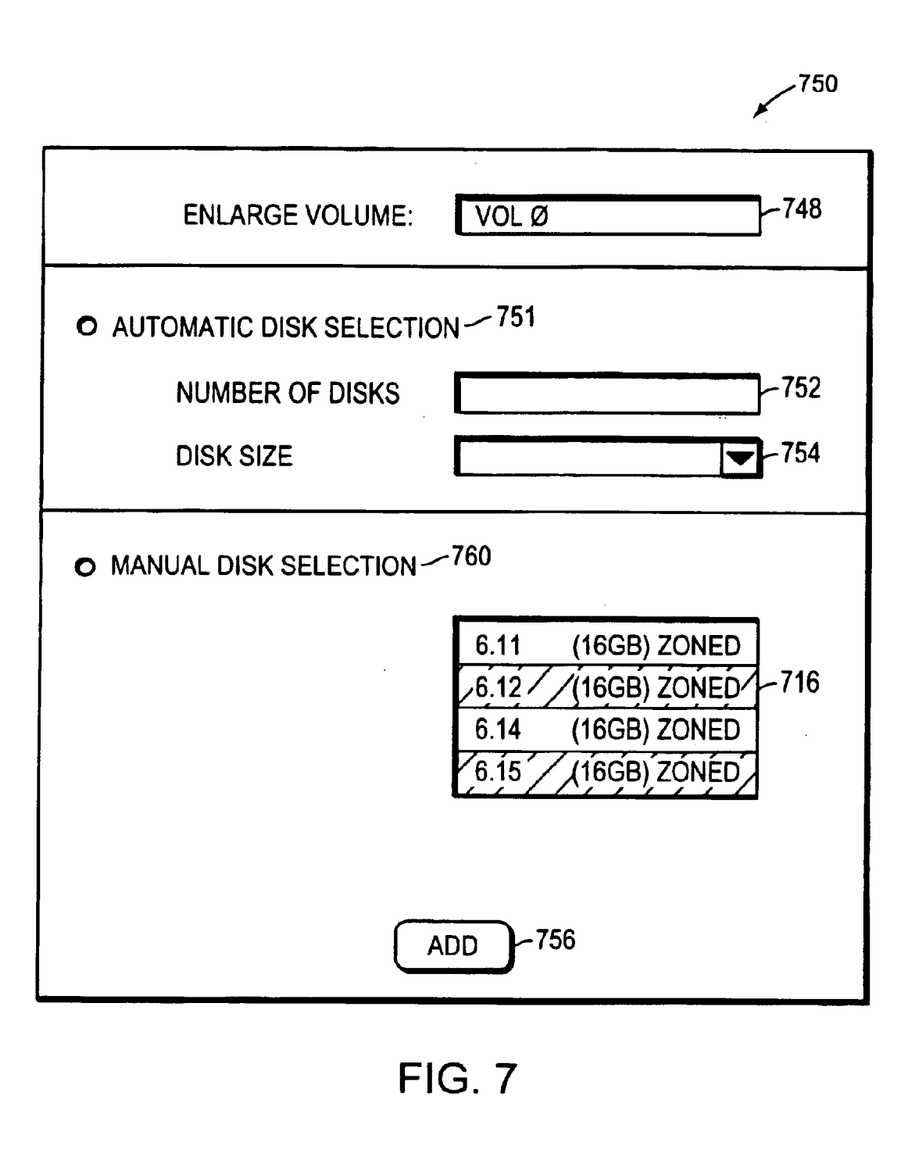
FIG. 7 is an exemplary screenshot of a GUI for a Disk Add operation, showing a Manual Disk Selection option with a candidate disk selector menu in accordance with this invention.

FIG. 7 shows an illustrative embodiment of one of the screens of the GUI displayed to a user for an "enlarge volume" operation. It is expressly contemplated that a variety of formats and organizational schemes for displaying and manipulating data can be employed. The version described herein is only one possible arrangement. FIG. 7 shows an illustrative GUI window 750 for enlarging a volume, i.e., adding disks to an existing volume. The GUI window 750 has a volume entry field 748, in which a user may enter the name of a particular volume to be enlarged. In this illustrative screenshot, two alternative, user-selectable techniques are once again provided. A user may select Automatic Disk Selection 751, e.g., by means of a "point and click" tool such as a mouse. With Automatic Disk Selection 751, there is a field for user entry of the number of disks 752 to be added to the named volume. Normally, in the exemplary system illustrated, the user can later add additional disks, but cannot remove disks from the volume. The GUI window 750 has a disk size field 754, for user entry of the size of the disks that are to be used, typically expressed today in GigaBytes (GB). For example, the disk size field 754 can present the disk sizes as a drop down menu of available sizes. If the user is willing to add disks of any size available, an "any size disk" entry is indicated in the menu. After the user enters the foregoing information in fields 752–754, and points and clicks on the "Add" button 756, the storage system responsively selects disks of suitable characteristics from the spare pool to be added to the named volume and proceeds with executing the configuration change with no further user involvement.

Alternatively, a Manual Disk Selection option 760 can be user selected. In response, the storage system presents a disk selector menu 716 to the user that displays disks that have been pre-selected/pre-qualified, based on the disks' validity for the existing volume. In accordance with the present invention, the disk selector menu 716 only displays those disks that are valid for the existing volume. Notably, the disks that are valid for the "volume add" operation are pre-selected before being displayed to the user. Then, responsive to the display, a user can select those disks to be added to the volume, e.g. by highlighting the menu entries using a point and click device. As illustrated, the menu can present the user with relevant information regarding the disks, such as disk size, checksum type, adapter ID, etc. to assist the user in making informed choices. After a user selects the disks, the user simply points and clicks on the "add" button 756 to enter his or her selections. The storage system responsively adds the selected disks to the existing volume with no further user involvement.

Figure 8:
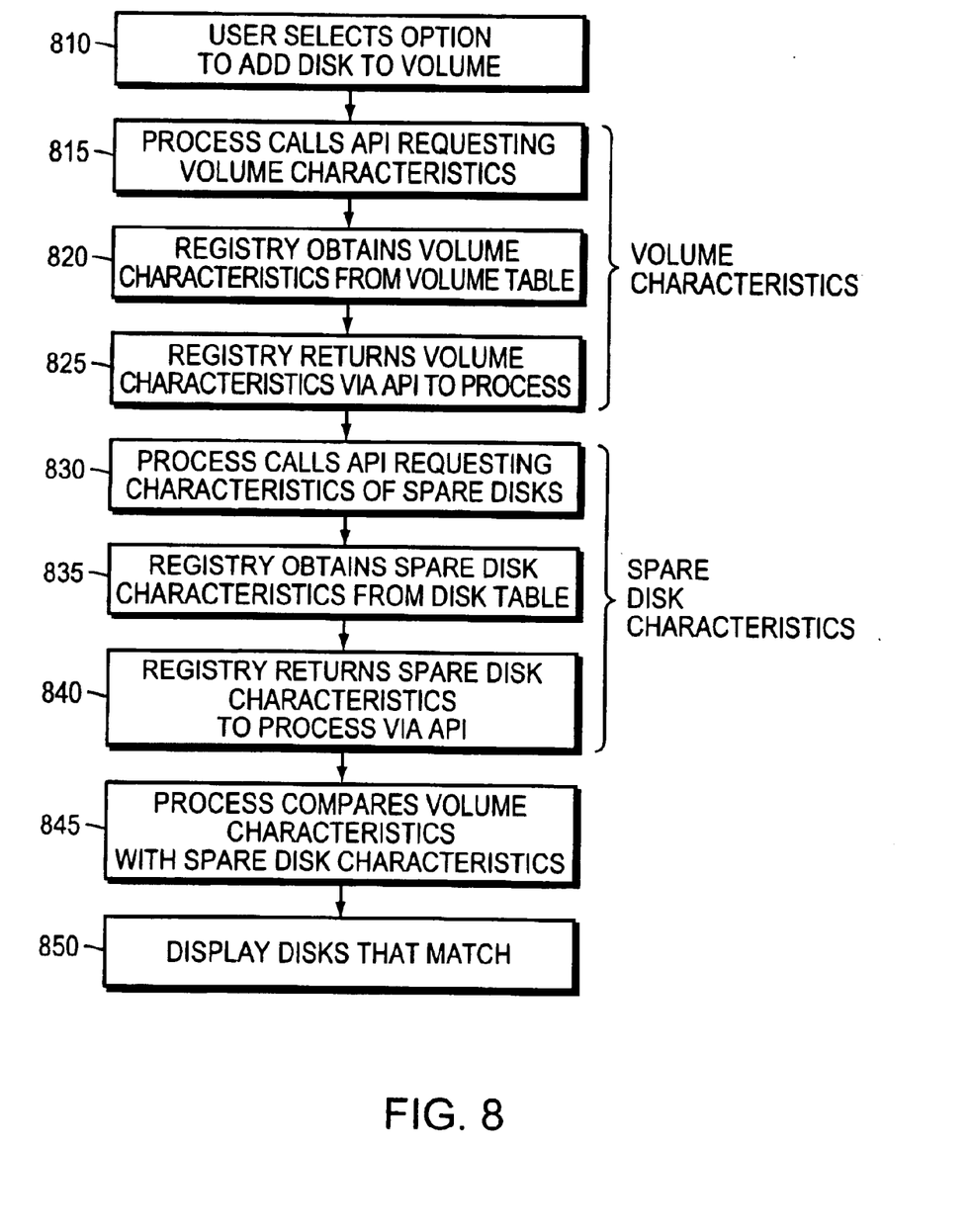
FIG. 8 is a flowchart showing the process for pre-selection of a disk to be added to a volume.

FIG. 8 is a flowchart detailing the pre-selection of candidate disk process for adding a disk to a volume. FIG. 8 shows an illustrative process for pre-selecting candidate disks when a disk is being added to a volume. According to step 810, the user selects an option to add a disk to a volume via an user-selectable option "button" or indicator within a graphical user interface. The user enters the name of the volume to be extended. In response, in step 815, a process (e.g. a servlet) running within the storage system executes a request for the characteristics of the volume that is to be grown. The request is sent to the Application Program Interface (API) of the registry.

The registry acquires the characteristics of the volume from the volume table in step 820, and returns the volume characteristics via the API at step 825. The process then calls the API and requests the characteristics of any spare disks (step 830). The registry obtains the requested characteristics of any spare disks from the disk table (step 835), and returns the data to the requesting process through the application program interface in step 840. The process then compares the volume characteristics with the characteristics of the spare disks (step 845) and displays those disks that match in a disk selector menu in step 850.

Steps 815 through 825 are associated with obtaining volume characteristics. Similarly, steps 830 through 845 obtain spare disk characteristics. It should be noted that these two actions can occur in any order, or even occur concurrently with each other. They are only shown and described in this order for ease of understanding.

Figure 9:
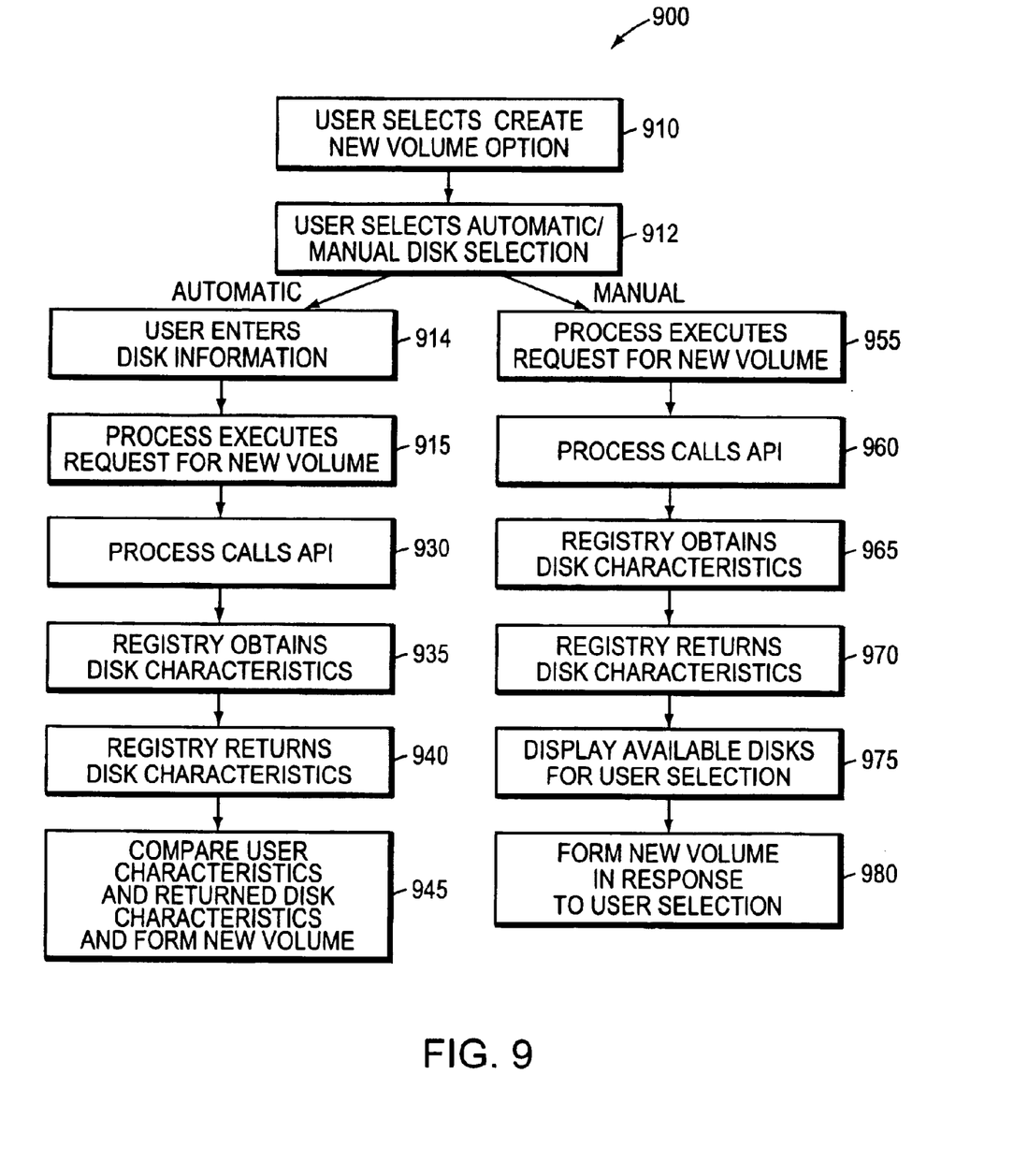
FIG. 9 is a flowchart showing the process of pre-selection of disks to be used when creating a volume.

FIG. 9 is a flowchart detailing the pre-selection of candidate disk process for creating a new volume. FIG. 9 shows an illustrative process 900 for pre-selecting/pre-qualifying candidate disks to be chosen by a user for use in the new volume. According to step 910, the user selects an option to create a new volume via an user-selectable option "button" or indicator within a graphical user interface. The user enters a new volume name, the RAID group size, and the language to be used for the volume. The user also selects whether he/she wishes to select disks for the new volume via Automatic Disk Selection or Manual Disk Selection (step 912).

If Automatic Disk Selection is indicated, the user enters the number of disks to be used in forming new volume, and their sizes (step 914). In response, in step 915, a process (e.g. a servlet) running within the storage system executes the request for a new volume of the noted characteristics. The request is sent to the Application Program Interface (API) of the registry. The process then calls the API and requests the characteristics of any spare disks (step 930). The registry obtains the requested characteristics of any spare disks from the disk table (step 935), and returns the data to the requesting process through the application program interface in step 940. The process then compares the user entered characteristics with the characteristics of the spare disks (step 945) and forms the new volume from arbitrarily selected ones of those disks.

On the other hand, if Manual Disk Selection is indicated, in response, in step 955, a process (e.g. a servlet) running within the storage system executes the request for a new volume of the noted characteristics. The request is sent to the Application Program Interface (API) of the registry. The process then calls the API and requests the characteristics of any spare disks (step 960). The registry obtains the requested characteristics of any spare disks from the disk table (step 965), and returns the data to the requesting process through the application program interface in step 970. The process then displays information regarding those disks, e.g. in menu format, for user selection (step 975), and responsive to the selection, forms the new volume from the user-selected ones of those disks (step 980). In making the selections, the user can use his/her own selection criteria. For example, the user may wish to keep certain types of data on certain shelves, or within a certain proximity on a shelf or shelves, and thus will choose only those disks sharing particular Adapter Ids or locations.

Figure 10:
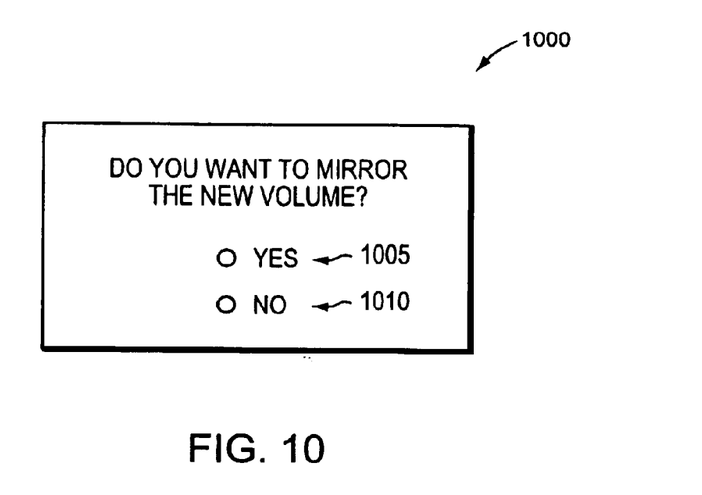
FIG. 10 is an exemplary screenshot of a GUI for a prompt for a mirroring option.
Figure 11:
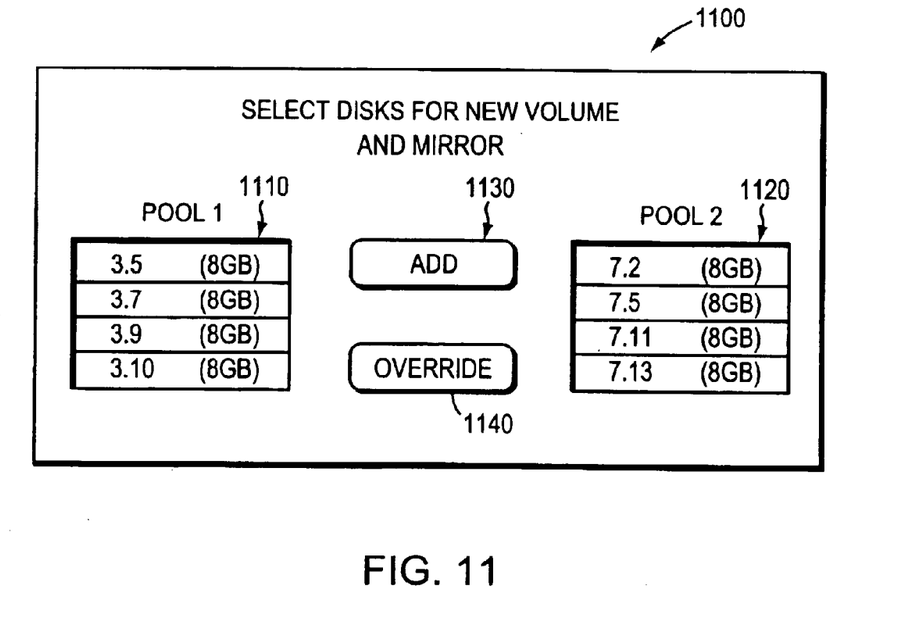
FIG. 11 is an exemplary screenshot of a Disk Selector Menu for a mirrored volume in accordance with this invention.
Figure 12:
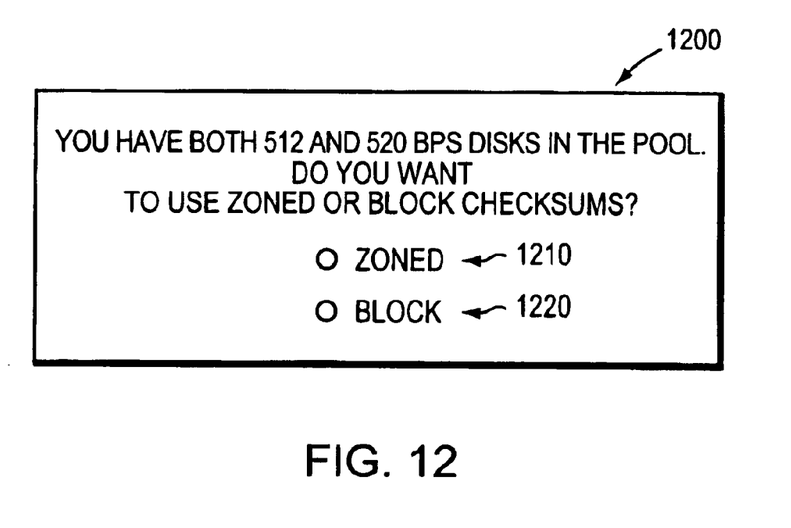
FIG. 12 is an exemplary screenshot of a checksum selector menu in accordance with an embodiment of this invention.

In one embodiment the storage operating system will provide a series of screens and prompts to guide a user through the creation of new volumes. FIG. 10 is an exemplary screenshot of a mirror decision window 1000 of such a wizard. The window has two selector buttons 1005 and 1010. The user will select the appropriate selector button depending on whether the user desires to have the volume mirrored or not. FIG. 11 is an exemplary screenshot of a Disk Selector Menu 1100 for a mirrored volume. The Disk Selector Menu has a listing of disk in one group, arbitrarily called Pool 1 1110 and another listing of disks in a Pool 2 1120. The contents of each list are disks that have been preselected in accordance with the teachings of this invention. The menu also includes a button to Add 1130 the selected disks to the newly created volume and an override button 1140, which allows a user to create a volume even if there are not enough spare disks to form the volume from pre-qualified disks. FIG. 12 is a Checksum Selector Menu 1200 with options that allow the user to select zoned 1210 or Block 1220 checksum for a new volume.

The foregoing has been a detailed description of preferred embodiments of the invention. Various modifications and additions can be made without departing from the spirit and scope of the invention. For example, file systems other than WAFL can be used. The Java Virtual Machine could be any type of operating environment. Other storage architecture, such as storage area networks can also be employed. The registry could be integrated into the file system layer. Accordingly, this description is meant to be taken only by way of example, and not to otherwise limit the scope of this invention.

What is claimed is:

1. A method for pre-selecting disks coupled to a storage system, the method comprising the steps of:
   obtaining, by a process running within the storage system, a set of system characteristics;
   obtaining, by said process, a plurality of disk characteristics;
   comparing, by said process, the system characteristics with the disk characteristics;
   selecting, by said process, disks whose disk characteristics match the system characteristics; and
   displaying the selected disks in a GUI and not displaying non-selected disks.

2. The method of claim 1 further comprising the step of displaying the selected disks to a user.

3. The method of claim 1 wherein the system characteristics comprise characteristics of a volume of the storage system.

4. The method of claim 3 wherein the step of obtaining system characteristics further comprises the steps of:
   retrieving the volume characteristics from a volume table, the volume table created and maintained by a file system layer of an operating system executing on the storage system.

5. The method of claim 1 wherein the system characteristics are obtained from a registry of the storage system.

6. The method of claim 5 wherein the registry further comprises:
   an application program interface, the application program interface permitting programs to interface with the registry.

7. The method of claim 1 wherein the pre-selection occurs when a menu is displayed to a user.

8. A graphical user interface (GUI) for managing a file server, the GUI comprising:
a disk selector menu for identifying disks that may serve as candidates for a set of operations, said disk selector menu prepared by a process running within the storage system and said disks identified by said process, the set of operations including addition of disks to a volume and creation of a volume, the disk selector menu only displaying disks which are valid for the operation.

9. The graphical user interface of claim 8 wherein the disk selector menu is a component of a web page and displayed in a web browser.

10. The graphical user interface of claim 8 wherein the disk selector menu only displays disks which are valid for a specific volume of the network storage.

11. A computer-readable medium operating on a storage system, the computer-readable medium including program instructions for performing the steps of:
obtaining system characteristics;
obtaining a plurality of disk characteristics;
comparing the disk characteristics to the system characteristics;
selecting disks whose disk characteristics match the system characteristics; and
displaying a list of the selected disks that may be added to the disks active in the storage system.

12. The computer-readable medium of claim 11 wherein the computer-readable medium is a Java servlet.

13. The computer-readable medium of claim 11 wherein the system characteristics further comprise:
a set of volume characteristics.

14. The computer-readable medium of claim 11 further programmed to perform the step of displaying the selected disks to the user, said list including only selected disks from a spare pool of disks and no others.

15. The computer-readable medium of claim 11 further programmed to perform the step of displaying the selected disks to the user in a disk selector menu.

16. The computer-readable medium of claim 11 wherein the disk selector menu is a component of a web page and displayed in a web browser.

17. Electromagnetic signals propagating over a computer network, the electromagnetic signals carrying information for practicing the method of claim 1.

18. A method of pre-selecting disks to be displayed in a menu, the pre-selecting occurring before the menu is displayed, the method comprising the steps of:
obtaining, by a process running within the storage system, a set of system characteristics;
obtaining, by said process, a set of spare disk characteristics;
comparing, by said process, the system characteristics to the spare disk characteristics; and,
pre-selecting, by said process, a plurality of spare disks whose characteristics match the system characteristics and displaying in the menu at least one pre-selected disk.

19. A method of pre-selecting disks to be added to a volume of a storage system, the method comprising the steps of:
obtaining, by a process running within the storage system, a set of volume characteristics by calling an application program interface of a registry;
obtaining, by said process, a set of spare disk characteristics by calling the application program interface of the registry; and pre-selecting, by said process, a set of disks based upon the spare disk characteristics matching the set of volume characteristics.

20. A method for pre-selecting disks coupled to a storage system, the method comprising the steps of:
obtaining a set of system characteristics;
obtaining a plurality of disk characteristics;
comparing the system characteristics with the disk characteristics;
selecting, disks whose disk characteristics match the system characteristics; and
displaying the selected disks in a GUI and not displaying non-selected disks.

21. A system for pre-selecting disks coupled to a storage system, the system comprising:
means for obtaining a set of system characteristics;
means for obtaining a plurality of disk characteristics;
means for comparing the system characteristics with the disk characteristics;
means for selecting, disks whose disk characteristics match the system characteristics; and
means for displaying the selected disks in a GUI and not displaying non-selected disks.

22. A method for pre-selecting disks coupled to a storage system, the method comprising the steps of:
requesting, by a process running within the storage system, a set of volume characteristics;
obtaining, by a registry, the volume characteristics from a volume table;
returning, via an interface, the volume characteristics to the process;
requesting, by the process, a plurality of disk characteristics;
obtaining, by the registry, the plurality of disk characteristics from a disk table;
returning, via the interface, the plurality of disk characteristics to the process;
comparing, by the process, the volume characteristics with the disk characteristics;
displaying for user selection only disks whose disk characteristics and are compatible with the volume characteristics.

23. A system for pre-selecting disks coupled to a storage system, the system comprising:
means for requesting, by a process running within the storage system, a set of volume characteristics;
means for obtaining, by a registry, the volume characteristics from a volume table;
means for returning, via an interface, the volume characteristics to the process;
means for requesting, by the process, a plurality of disk characteristics;
means for obtaining, by the registry, the plurality of disk characteristics from a disk table;
means for returning, via the interface, the plurality of disk characteristics to the process;
means for comparing, by the process, the volume characteristics with the disk characteristics;
means for displaying for user selection only disks whose disk characteristics and are compatible with the volume characteristics.

* * * * *